Jan. 19, 1960  B. W. SCHABOT  2,921,487
INDEXING FIXTURE
Filed Aug. 27, 1956  2 Sheets-Sheet 1
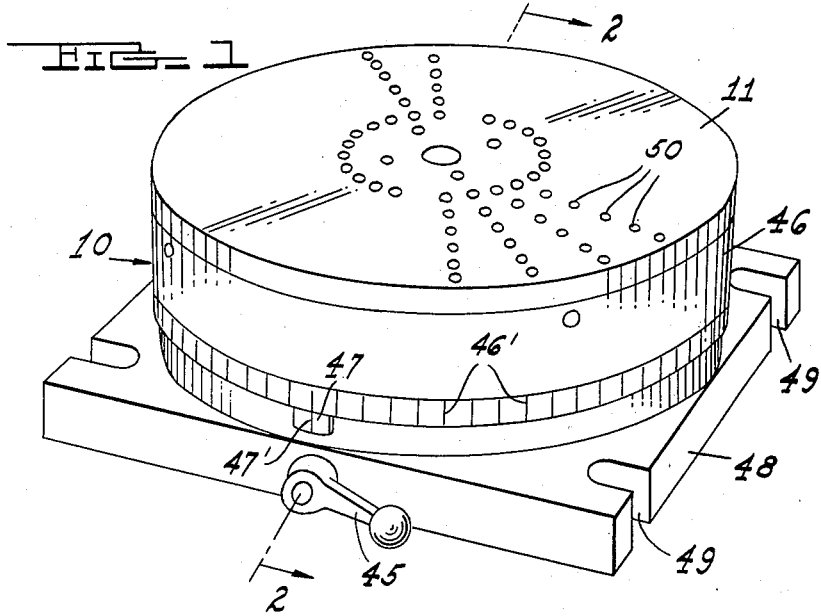
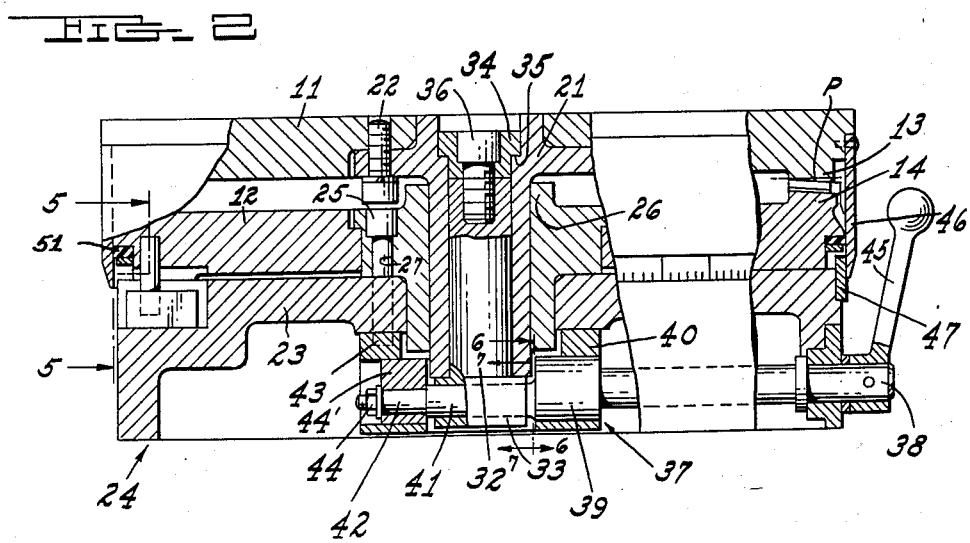
INVENTOR.
BERNARD W. SCHABOT
BY
Barnes, Kisselle, Laughlin & Raisch
ATTORNEYS Jan. 19, 1960     B. W. SCHABOT     2,921,487
INDEXING FIXTURE
Filed Aug. 27, 1956     2 Sheets-Sheet 2
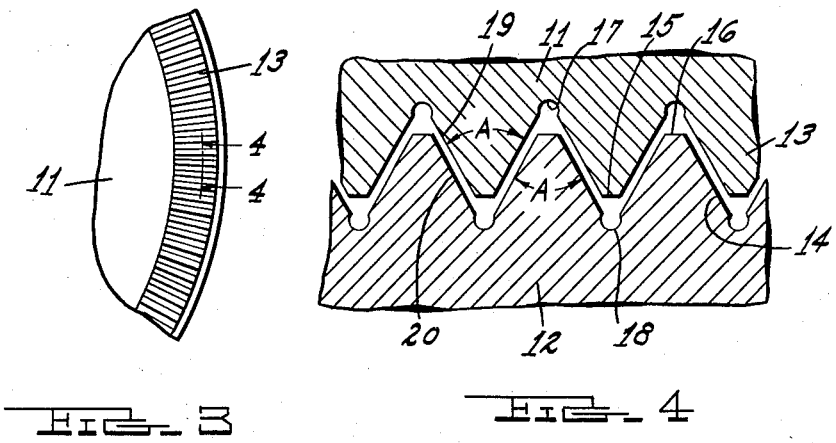
FIG. 3     FIG. 4
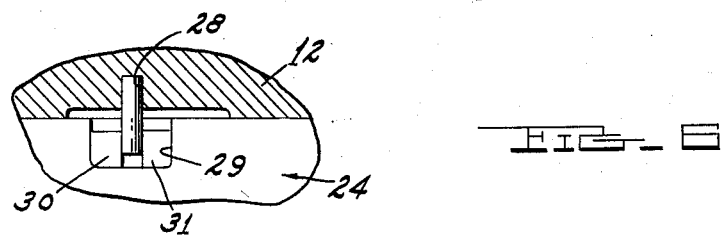
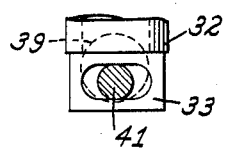
FIG. 5
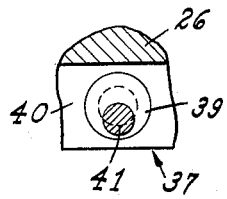
FIG. 7
FIG. 6
INVENTOR.
BERNARD W. SCHABOT
BY
Barnes, Kisselle, Laughlin & Raisch
ATTORNEYS

United States Patent Office 2,921,487
Patented Jan. 19, 1960

2,921,487

INDEXING FIXTURE

Bernard William Schabot, Royal Oak, Mich.

Application August 27, 1956, Serial No. 606,499

10 Claims. (Cl. 77—64)

This invention relates to indexing fixtures and particularly to an indexing fixture which is used for changing the angular position of a workpiece.

In handling a workpiece in the metal-working industry, for example in jig grinding or boring, an indexing fixture is commonly used where it is desired to perform a series of operations at angularly spaced points on the workpiece. Such indexing fixtures usually comprise a table on which the workpiece is supported and a base on which the table is rotatably mounted by means of bearings. The angular position of the table to the base and, in turn, of the workpiece is changed by a worm which meshes with an annular worm gear on the underside of the table. Rotation of the worm causes rotation of the table.

A major disadvantage of such an indexing fixture is that some type of accurate angular measuring device must be used in connection therewith in order that the angle of rotation will be accurately determined. This requires extreme care and necessarily involves an expenditure of a great deal of time in making each angular adjustment. In addition, since the worm meshes successively with different portions of the worm gear, the degree of angular movement for every rotation of the worm may vary because the successive portions of the worm and gear may vary in size and shape, so that it is not possible to accurately predetermine the angular movement in terms of rotation of the worm. A further disadvantage of the indexing fixtures is that some additional locking means must be provided to lock the table in its adjusted position relative to the base. Another disadvantage is that, upon wear of the bearings which support the table, the level of the table is changed thus further affecting the accuracy of the indexing fixture. In addition, the use of the bearings necessitates care in keeping the bearings clean and properly lubricated.

It is therefore an object of this invention to provide an indexing fixture which may be used to quickly and accurately change the angular position of a workpiece without the use of any additional angular measuring devices.

It is a further object of this invention to provide such an indexing fixture which is of high accuracy at any angular position.

It is a further object of this invention to provide such an indexing fixture the table of which is accurately positioned in the same plane throughout the angular positions thereof.

It is a further object of this invention to provide such an indexing fixture which is quickly and easily locked into adjusted position.

It is a further object of this invention to provide such an indexing fixture which is not adversely affected by wear of the parts.

It is a further object of this invention to provide such an indexing fixture which does not utilize bearings.

In the drawings:

Fig. 1 is a perspective view of the indexing fixture.

Fig. 2 is a sectional elevational view taken along the line 2—2 in Fig. 1.

Fig. 3 is a plan view of the serrations on the underside of the upper plate of the indexing fixture.

Fig. 4 is a sectional view taken along the line 4—4 in Fig. 3, on an enlarged scale.

Fig. 5 is a sectional view taken along the line 5—5 in Fig. 2.

Fig. 6 is a sectional view taken along the line 6—6 in Fig. 2.

Fig. 7 is a sectional view taken along the line 7—7 in Fig. 2.

Referring to Figs. 1 and 2, the indexing fixture 10 comprises an upper plate 11 and a lower plate 12 positioned in superposed relationship and having an annular series of radially extending serrations 13, 14, respectively, along the periphery of the adjacent faces thereof. Serrations 13 on upper plate 11 are identical in cross sectional configuration with the serrations 14 on lower plate 12 and mesh therewith to lock upper plate 11 against rotation relative to lower plate 12. Serrations 13, 14 are equally spaced angularly along the periphery of their respective plates.

As shown in Fig. 4, the apexes 15, 16 of the serrations are preferably flattened and the base or valleys 17, 18 between the serrations are countersunk so that the serrations engage along the inclined faces 19, 20. 360 serrations are preferably provided along the periphery of each plate so that, by moving one of the plates 11, 12 axially relative to the other and then rotating one plate relative to another by one serration, the relative angular position of the plates is changed by one degree. In this manner, the position of one plate relative to the other may be accurately changed in any number of degrees, as more fully described hereinafter. The included angle A between the surfaces or faces of each serration is preferably 60° but may be more or less than 60°.

As shown in Fig. 2, each of the serrations has a radial pitch P. In the case where 360 serrations are provided, the pitch is 0°, 25 minutes, 59 seconds. As shown in Fig. 2, the serrations 13 and 14 extend upwardly and radially inwardly. This construction may, of course, be changed so that the serrations extend upwardly and radially outwardly.

Referring to Fig. 2, upper plate 11 is maintained in axial alignment with lower plate 12 by means of a hub 21 bolted to the center thereof by bolts 22. Lower plate 12 rests upon top wall 23 of base 24 and is maintained in position thereon by a bolt 25. Bolt 25 passes through an opening in a second hub 26 press fitted into the center of lower plate 12 and surrounding hub 21. The opening 27 into which bolt 25 extends is of slightly larger diameter than bolt 25 so that lower plate 12 has limited angular rotation relative to base 24, the difference in size being such that lower plate 12 has about one degree of relative movement.

As shown in Figs. 2 and 5, lower plate 12 is locked in position angularly relative to base 24 by a pin 28 mounted in the lower plate 12 and projecting downwardly into a space or cavity 29 on the upper periphery of top wall 23 of base 24. Accurately dimensioned spacers or blocks 30, 31 are positioned on either side of pin 28 to wedge and lock pin 28 and, in turn, the lower plate 12 in position relative to base 24.

The lifting of upper plate 11 in an axial direction relative to lower plate 12 in order to permit manual rotation of upper plate 11 relative to lower plate 12 is achieved by a construction including a shaft 32 having an enlarged lower portion 33 and extending upwardly through the opening in hub 21. Shaft 32 is maintained in position in hub 21 by a cap 34 which engages a shoulder 35 in hub 21 and is held in position by a bolt 36 threaded into shaft 32.

An actuating rod 37 has the outer end 38 thereof journalled in the peripheral wall of base 24 and is provided with an enlarged intermediate portion 39 journalled in a projection 40 near the center of base 24. Inner end 41 of actuating rod 37 is eccentric relative to enlarged portion 39 and extends through the enlarged part 33 of shaft 32. Innermost end 42 of actuating rod 37 is journalled in a second projection 43 extending downwardly from top wall 23 of base 24. End 42 is retained in a bushing 44' that is journalled in second projection 43 for rotation. Second projection 43 is aligned axially with projection 40. A nut 44 is threaded on the end of portion 42 to maintain the actuating rod 37 in position axially. An actuating handle 45 is mounted on the outer end 38 of actuating rod 37.

By rotating actuating rod 37, the eccentric portion 41 of the rod is caused to move in an arc thereby moving shaft 32 and, in turn, hub 21 and upper plate 11 upwardly and downwardly axially relative to lower plate 12 and bringing serrations 13 and 14 out of and into engagement. In the elevated position, upper plate 11 may be rotated to change the angular position thereof relative to lower plate 12. In order to serve as a guide, a skirt 46 is provided along the outer periphery of upper plate 11 and projects downwardly. A plate 47 bearing a scribe mark 47' is fixed on the base while equally spaced angular scribe marks 46' are provided on the skirt 46. A gasket 51 supported by lower plate 12 is provided between the periphery of plate 12 and the skirt 46 to prevent the entry of dust and dirt into the serrations 13, 14.

These scribe marks indicate to an operator the number of degrees he has rotated plate 11 on base 24. By actuating handle 45 to rotate actuating rod 37 in the opposite direction, upper plate 11 is lowered and is thereby locked in the desired angular position relative to lower plate 12. Inasmuch as the serrations 13 and 14 are accurately formed, the upper and lower plates 11 and 12 are locked accurately in the predetermined angular position.

Base 24 is provided with a peripheral flange 48 and slots 49 so that it may be readily mounted on a work table or other working surface of the machine. Threaded holes 50 are provided in upper plate 11 to assist in clamping or mounting the workpiece on the plate 11 (Fig. 1).

Additional indexing fixtures may be made from a single indexing fixture by mounting plates on upper plate 11 and accurately grinding serrations thereon by rotating the upper plate 11 successively through the desired spacing between the serrations.

In case it becomes necessary to change the angular position of a workpiece by a fraction of a degree, this may be readily done by removing blocks 30, 31 (Fig. 5) and replacing them with gaging blocks of different thicknesses whereby the angular position of lower plate 12 will be changed relative to base 24 by a fraction of a degree. Inasmuch as upper plate 11 is locked to lower plate 12 by serrations 13, 14, the angular position of the upper plate 11 which supports the workpiece will also be changed by a fraction of a degree. By previously measuring the thicknesses of the various blocks, the exact portion of the degree through which lower plate 12 is moved relative to base 24 may be accurately controlled by using predetermined blocks.

Although certain other methods of making a first indexing fixture may appear obvious after the disclosure of my device, the first indexing device was made by lapping 120 cylindrical pins to an accurate diameter of plus or minus two millionths of an inch. These pins were then placed around the periphery of a disc. The disc was made to accurate dimensions within millionths of an inch and the diameter of the disc is such that when the 120 pins are positioned around the periphery the pins are in tangential contact to each other. A ring was then shrunk around the pins to produce a fixture which has 120 accurately and equally spaced pins around the periphery thereof. This fixture was then used as a guide for grinding 120 serrations on a ring by placing a locating point successively at the point of juncture between each pair of pins. The fixture was then indexed manually as accurately as possible by one degree and a second set of serrations was ground in the ring. The accuracy of the second set of serrations from the standpoint of spacing relative to the first set was accurately checked. Finally, the fixture was indexed another degree as accurately as possible and a final set of serrations was ground to complete the 360 serrations. In each position of the fixture the pins provided 120 accurately and equally spaced locating points.

I have found that the indexing device which comprises my invention provides a means whereby the angular position of a workpiece may be quickly and accurately changed for a required number of degrees without the use of any external, angular measuring devices. The angular movement is extremely accurate and consistent throughout the 360 degrees of movement of the indexing fixture. The only contact between the two rotating portions of the fixture is in the serrations where 720 contacting faces are provided. The indexing fixture is not adversely affected by wear but, on the contrary, the continued use thereof results in a lapping of the serrations producing a more accurate indexing fixture.

I have found that when the level of the upper surface of the upper plate 11 is checked, the variation is not more than $1/10,000$ in 360 degrees of rotation. No additional locking means is needed to lock the indexing fixture in position after the angle is changed. No bearings are used and therefore there is no problem of wear of bearings or maintenance thereof.

I claim:

1. In an indexing fixture including a base, a first plate mounted for limited rotational movement relative to said base, a second plate mounted on and overlying said first plate and being rotatable relative to said first plate about an axis coincident with the axis of limited rotation of said first plate relative to said base, said second plate being axially movable toward and away from said first plate, the juxtaposed faces of said first and second plates being provided with a plurality of radially extending serrations around the periphery thereof, said serrations being equally angularly spaced, whereby the angular position of said second plate relative to said first plate may be changed by moving said second plate axially away from said first plate to bring said serrations out of engagement, rotating said second plate relative to said first plate and thereafter moving said second plate axially toward said first plate to engage said serrations and lock said plates in said new angular position, means for effecting an accurately predetermined angular movement of said first plate relative to said base, which movement is less than the angular spacing of said teeth, said means comprising a cavity in one of said first plate and base, said cavity being spaced radially from the center of said first plate, a member mounted on the other of said first plate and base and projecting into said cavity, said member having a width less than the width of said cavity, first spacer means of accurately predetermined width extending between one edge of said cavity and one side of said member, and second spacer means extending between the other edge of said cavity and the other side of said member and forcing said member against said first spacing means.

2. In an indexing fixture including a base, a first plate mounted for limited rotational movement relative to said base, a second plate mounted in overlying relationship to said first plate and being rotatable relative to said first plate about an axis coincident with the axis of limited rotation of said first plate relative to said base, said second plate being axially movable toward and away from said first plate, the juxtaposed faces of said first and second plates being provided with a plurality of radially extending serrations around the periphery thereof, said serrations being equally angularly spaced, whereby the angular position of said second plate relative to said first plate may be changed by moving said second plate axially away from said first plate to bring said serrations out of engagement, rotating said second plate relative to said first plate and thereafter moving said second plate axially toward said first plate to engage said serrations and lock said plates in said new angular position, means for effecting an accurately predetermined angular movement of said first plate relative to said base, which movement is less than the angular spacing of said teeth, said means comprising a cavity in one of said first plate and base, said cavity being spaced radially from the center of said first plate, a member mounted on the other of said first plate and base and projecting into said cavity, said member having a width less than the width of said cavity, a pair of spacing blocks having predetermined combined thickness which, when added to the thickness of the member, equals the width of the cavity, one said spacing block being positioned on one side of said member and the other said spacing block being positioned on the other side of said member, whereby said spacing blocks can be removed and replaced with another set of spacing blocks having the same combined thickness but having individually different thicknesses.

3. The combination set forth in claim 2 wherein said cavity is provided in the periphery of said first plate and said member projecting into said cavity is mounted in said base.

4. A rotary precision work holding table comprising a base adapted to be secured to a supporting table of a machine tool, a top plate having a flat upper surface provided with means formed as a part thereof for clamping a work piece to the flat upper face of said plate, a relatively narrow ring of accurately formed and accurately equally spaced teeth on the lower face of said plate and closely adjacent the outer periphery thereof, the radius of the annular ring of teeth being many times the radial extent of each tooth, said annular ring lying in a plane accurately parallel to the plane of said upper face, a lower plate normally non-rotatably fixed relative to and supported by said base, said lower plate having a similar relatively narrow annular ring of accurately formed and accurately equally spaced teeth axially aligned with and adapted to intermesh with the teeth on said top plate, means supporting said top plate for movement toward and away from said lower plate to interengage and to disengage said two annular rings of teeth and for rotation about an axis perpendicular to the plane of said upper face and accurately coinciding with the axial center of said rings, said teeth, when interengaged, providing the sole means for supporting and transferring the entire weight of said top plate and the work piece mounted thereon to the lower plate.

5. The combination set forth in claim 4 wherein vernier means is provided for effecting an accurately determined angular movement of said top plate relative to said base, which movement is less than the angular spacing of said teeth.

6. The combination set forth in claim 4 wherein the meshing teeth on said two plates number at least sixty or a multiple thereof.

7. The combination set forth in claim 5 wherein the meshing teeth on said two plates number at least sixty or a multiple thereof.

8. The combination set forth in claim 4 wherein said top plate is circular and wherein said means for clamping comprise plurality of apertures formed in the upper surface thereof.

9. The combination set forth in claim 4 wherein the annular ring of teeth on each plate is formed integrally with its respective plate and the mass of each plate is substantially greater than the mass of the teeth of each plate.

10. The combination set forth in claim 4 wherein said means mounting the top plate for rotation comprise a cylindrical shaft member on one of said plates, the axis of which is accurately coaxial with the center axis of the annular ring of teeth on said last mentioned plate, the other plate having a central bore, the axis of which is accurately coaxial with the center axis of the annular ring of teeth on said other plate, said shaft portion having an accurate close fit in said bore, the shaft portion and the bore having a uniform diameter throughout their axial extent of interengagement.

References Cited in the file of this patent

UNITED STATES PATENTS

| | | |
|---|---|---|
| 993,290 | Bullard | May 23, 1911 |
| 1,461,316 | La Casse | July 10, 1923 |
| 1,690,568 | Bullard | Nov. 6, 1928 |
| 2,202,117 | Muller | May 28, 1940 |
| 2,366,079 | Wilson | Dec. 26, 1944 |
| 2,406,906 | Saunders | Sept. 3, 1946 |
| 2,432,336 | Peters | Dec. 9, 1947 |

FOREIGN PATENTS

| | | |
|---|---|---|
| 580,135 | Great Britain | Aug. 28, 1956 |